(12) United States Patent
Suzuki (10) Patent No.: US 11,780,524 B2
(45) Date of Patent: Oct. 10, 2023

(54) FRONT FENDER (71) Applicant: SUZUKI MOTOR CORPORATION, Hamamatsu (JP)

(72) Inventor: Kyoma Suzuki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 104 days.

(21) Appl. No.: 17/482,616

(22) Filed: Sep. 23, 2021

(65) Prior Publication Data
US 2022/0089240 A1 Mar. 24, 2022

(30) Foreign Application Priority Data
Sep. 24, 2020 (JP) ................. 2020-159519

(51) Int. Cl.
B62J 15/00 (2006.01)

(52) U.S. Cl.
CPC ..................... B62J 15/00 (2013.01)

(58) Field of Classification Search
CPC ................. B62J 15/00; B62J 15/02
See application file for complete search history.

(56) References Cited

U.S. PATENT DOCUMENTS

| | | | | |
|---|---|---|---|---|
| 2,120,453 A * | 6/1938 | Anderson | ................ | B62J 15/00 D12/186 |
| 4,458,909 A * | 7/1984 | Morioka | .................. | B62J 15/00 180/219 |
| 4,485,884 A * | 12/1984 | Fukunaga | .............. | B62K 19/48 280/281.1 |
| 4,770,460 A * | 9/1988 | Miura | ...................... | B62J 17/10 296/180.1 |
| 5,165,712 A * | 11/1992 | Fuller | .................... | B62K 25/08 280/157 |
| 6,217,048 B1 * | 4/2001 | Saiki | ........................ | B62J 15/02 280/852 |
| 7,036,837 B1 * | 5/2006 | Bauer | ........................ | B62J 1/12 224/430 |
| 2004/0075543 A1 * | 4/2004 | Miyamoto | .............. | B62J 15/00 340/432 |

(Continued)

FOREIGN PATENT DOCUMENTS

| | | |
|---|---|---|
| JP | H02-105083 U | 8/1990 |
| JP | 7-89474 A | 4/1995 |

OTHER PUBLICATIONS

Extended European Search Report issued in EP 21198457.0 dated Feb. 22, 2022.

Primary Examiner — Erez Gurari
(74) Attorney, Agent, or Firm — TROUTMAN PEPPER HAMILTON SANDERS LLP (57) ABSTRACT There is provided a front fender including: a fender upper portion that covers, from above, a front wheel provided with a brake disc; and a fender side portion that covers an upper portion of the brake disc from a lateral side of the brake disc. The fender side portion is formed with a bulging portion that bulges outward in a vehicle width direction at a front side of the fender side portion and an air discharge port that is configured to discharge traveling wind flowing into the bulging portion. The air discharge port is positioned at a rear face side of the bulging portion which is a blind spot in a front view of the front fender.

7 Claims, 6 Drawing Sheets (56) References Cited

U.S. PATENT DOCUMENTS

| | | | |
|---|---|---|---|
| 2005/0062278 A1* | 3/2005 | Griffin | B62J 15/02 280/847 |
| 2008/0150314 A1* | 6/2008 | Van Der Westhuizen | B62J 15/00 296/78.1 |
| 2012/0139226 A1 | 6/2012 | Yanagita | |
| 2016/0137247 A1* | 5/2016 | Sasaki | B62K 5/10 280/124.103 |
| 2016/0176464 A1* | 6/2016 | Ishikawa | B62J 15/02 280/291 |
| 2016/0214674 A1* | 7/2016 | Mizuta | B62J 1/12 |
| 2016/0229476 A1* | 8/2016 | Yasuta | B62J 35/00 |
| 2016/0264199 A1* | 9/2016 | Wakita | B62J 15/00 |
| 2017/0282989 A1* | 10/2017 | Niijima | B62J 1/12 |
| 2019/0118889 A1* | 4/2019 | Koishikawa | B62J 11/16 |
| 2019/0210684 A1* | 7/2019 | Katagiri | B62K 25/02 |
| 2022/0042667 A1* | 2/2022 | Yoshiura | B62J 15/00 |
| 2022/0089240 A1* | 3/2022 | Suzuki | B62J 15/00 |
| 2022/0119060 A1* | 4/2022 | Hatano | B32B 1/00 |
| 2022/0144362 A1* | 5/2022 | Noel | B62J 15/00 |

* cited by examiner

FRONT FENDER

CROSS-REFERENCE TO RELATED APPLICATION

This application is based on Japanese Patent Application No. 2020-159519 filed on Sep. 24, 2020, the contents of which are incorporated herein by way of reference.

TECHNICAL FIELD

The present invention relates to a front fender.

BACKGROUND

A front fender is provided in a straddle-type vehicle as a front wheel mudguard. When a brake disc is covered by the front fender, traveling wind is blocked by the front fender, and a cooling effect of the brake disc is reduced. Therefore, a front fender formed with an intake port for a traveling wind at a front face is proposed (see JP-A-H7-89474, for example). A guide wall is formed at an inner side of the front fender disclosed in JP-A-H7-89474, traveling wind flowing in the front fender from the intake port is guided to the brake disc by the guide wall, and the brake disc is actively cooled by the traveling wind.

However, the intake port is formed in the front face of the front fender disclosed in JP-A-H7-89474, the intake port is noticeable when viewed from a front side, and an appearance of the vehicle is deteriorated. Although the guide wall is formed at the inner side of the front fender, a size of the front fender is increased due to the guide wall, which greatly affects the appearance of the vehicle. Since a direction of a flow of the traveling wind is changed by the guide wall, the traveling wind is less likely to flow smoothly, and thus a cooling effect of the brake disc may not be sufficiently obtained.

The present invention has been made in view of the above circumstance, and an object of the present invention is to provide a front fender that can effectively cool a brake disc without deteriorating an appearance of a vehicle.

SUMMARY

There is provided a front fender including: a fender upper portion that covers, from above, a front wheel provided with a brake disc; and a fender side portion that covers an upper portion of the brake disc from a lateral side of the brake disc. The fender side portion is formed with a bulging portion that bulges outward in a vehicle width direction at a front side of the fender side portion and an air discharge port that is configured to discharge traveling wind flowing into the bulging portion. The air discharge port is positioned at a rear face side of the bulging portion which is a blind spot in a front view of the front fender

DETAILED DESCRIPTION

A front fender according to an aspect of the present invention includes a fender upper portion that covers, from above, a front wheel provided with a brake disc, and a fender side portion that covers an upper portion of the brake disc from a side. The fender side portion is formed with a bulging portion that bulges outward in a vehicle width direction from a front edge of the fender side portion toward a rear side, and an air discharge port that discharges traveling wind from an inner side of the bulging portion is formed at a rear face side of the bulging portion. Since the traveling wind flows into the bulging portion and the traveling wind is discharged from the air discharge port at the rear face side of the bulging portion, the traveling wind smoothly flows into the bulging portion, and a brake disc inside the fender side portion is effectively cooled by the traveling wind. Since the air discharge port is formed at a blind spot formed in the bulging portion in a front view, the air discharge port is less likely to be noticeable and an appearance of the vehicle is not deteriorated. In addition, the size of the front fender is not increased to an extent of affecting the appearance of the vehicle due to the formation of the air discharge port in the front fender.

Figure 1:
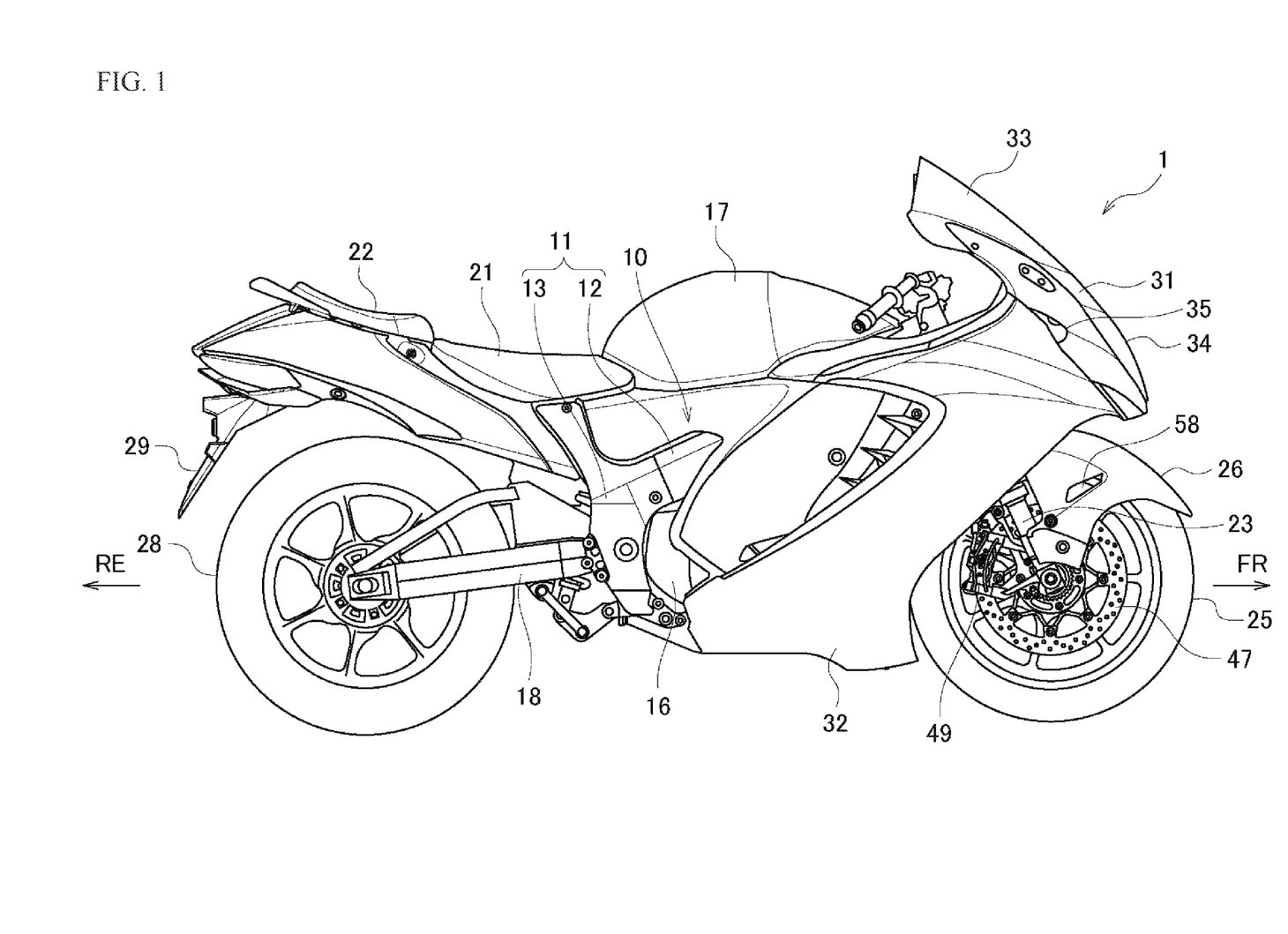
FIG. 1 is a right side view showing a straddle-type vehicle according to an embodiment.

Hereinafter, an embodiment will be described in detail with reference to the accompanying drawings. FIG. 1 is a right side view showing a straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, in the straddle-type vehicle 1, various components such as an engine 16 and an electrical system are mounted on a twin spar type vehicle body frame 10 formed by aluminum casting. The vehicle body frame 10 includes a pair of main frames 11 that are branched off from a head pipe (not shown) to left and right sides and extend rearward, and a pair of down frames (not shown) that are branched off from the head pipe to the left and right sides and extend downward. A rear portion of the engine 16 is supported by the pair of main frames 11, and a front portion of the engine 16 is supported by the pair of down frames. The engine 16 is supported by the vehicle body frame 10, so that rigidity of the entire vehicle is ensured.

Front portions of the pair of main frames 11 serve as tank rails 12 located above the engine 16, and a fuel tank 17 is supported by the tank rails 12. Rear portions of the pair of main frames 11 serve as body frames 13 located rearward of the engine 16, and swing arms 18 are swingably supported by substantially intermediate portions in an upper-lower direction of the body frames 13. A seat rail (not shown) and a back stay (not shown) extend rearward from upper portions of the body frames 13. A rider seat 21 and a pillion seat 22 are supported on the seat rail at a rear side of the fuel tank 17.

A pair of front forks 23 are steerably supported on the head pipe via a steering shaft (not shown). A front wheel 25 is rotatably supported by lower portions of the front forks 23, and an upper portion of the front wheel 25 is covered with a front fender 26. The swing arms 18 extend rearward from the body frames 13. A rear wheel 28 is rotatably supported by rear ends of the swing arms 18, and an upper side of the rear wheel 28 is covered with a rear fender 29. The engine 16 is coupled to the rear wheel 28 via a chain drive type transmission mechanism, and power is transmitted from the engine 16 to the rear wheel 28 via the transmission mechanism.

Various covers are attached to the vehicle body frame 10 of the straddle-type vehicle 1 as vehicle body exteriors. For example, a front face side of a vehicle front portion is covered with a front cowl 31, and side face sides of the vehicle front portion are covered with a pair of side cowls 32. A screen 33 is provided on an upper portion of the front cowl 31, and a headlamp 34 and a pair of turn signal lamps 35 are exposed from a front face of the front cowl 31. A vehicle body front portion is formed into a streamline shape by these cowls, lamps, and the like, and traveling wind smoothly flows from a vehicle front side toward a vehicle rear side, so that air resistance to the vehicle body front portion is reduced.

A disc brake is adopted as a front brake of the straddle-type vehicle 1. A brake disc 47 is sandwiched by brake calipers 49 so as to generate a braking force applied to the front wheel 25. Since frictional heat is generated during braking of the brake disc 47, the brake disc 47 needs to be cooled by traveling wind. Therefore, the front fender 26 according to the present embodiment is formed with an air discharge port 58 so that traveling wind is discharged from an inner side to an outer side of the front fender 26. In this case, a position of the air discharge port 58 and an outer shape of the front fender 26 are designed in consideration of an appearance of the vehicle and aerodynamic performance.

Figure 2:
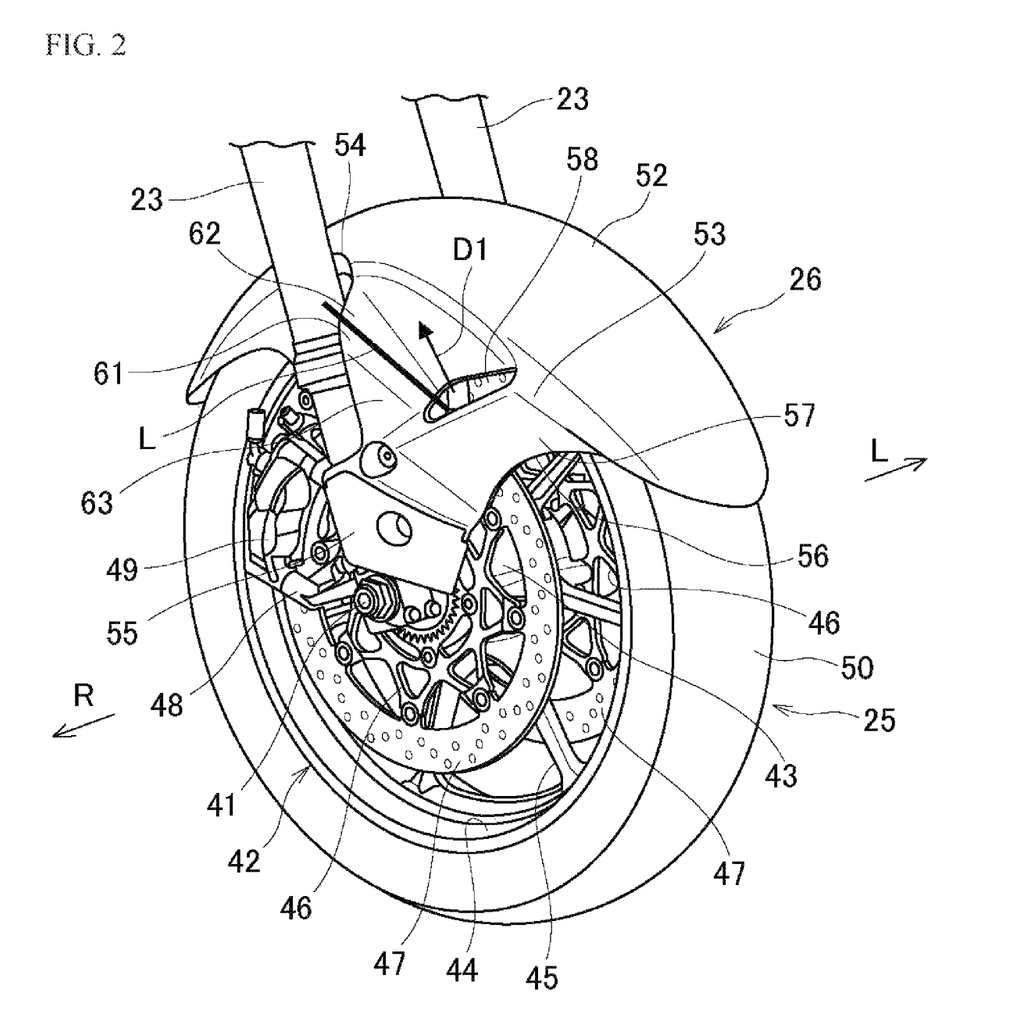
FIG. 2 is a perspective view showing a front wheel equipped with a front fender according to the present embodiment.
Figure 3:
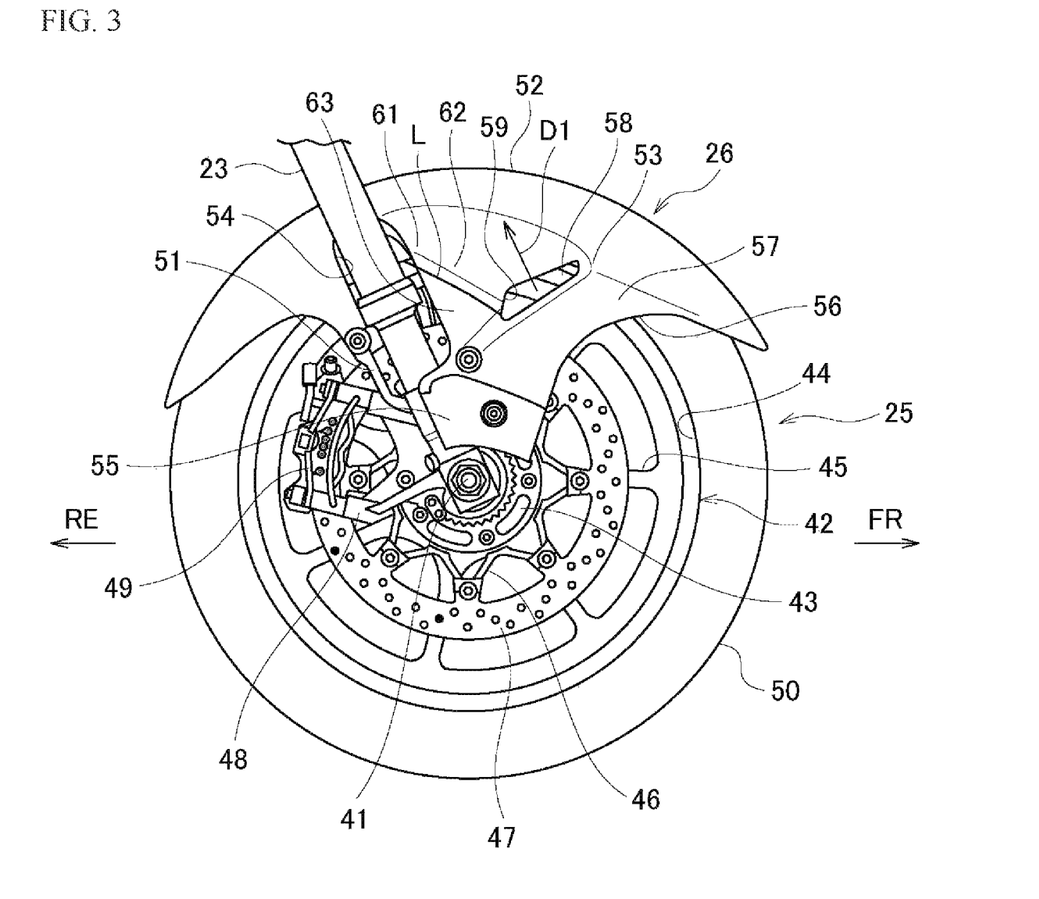
FIG. 3 is a side view showing the front wheel equipped with the front fender according to the present embodiment.
Figure 4:
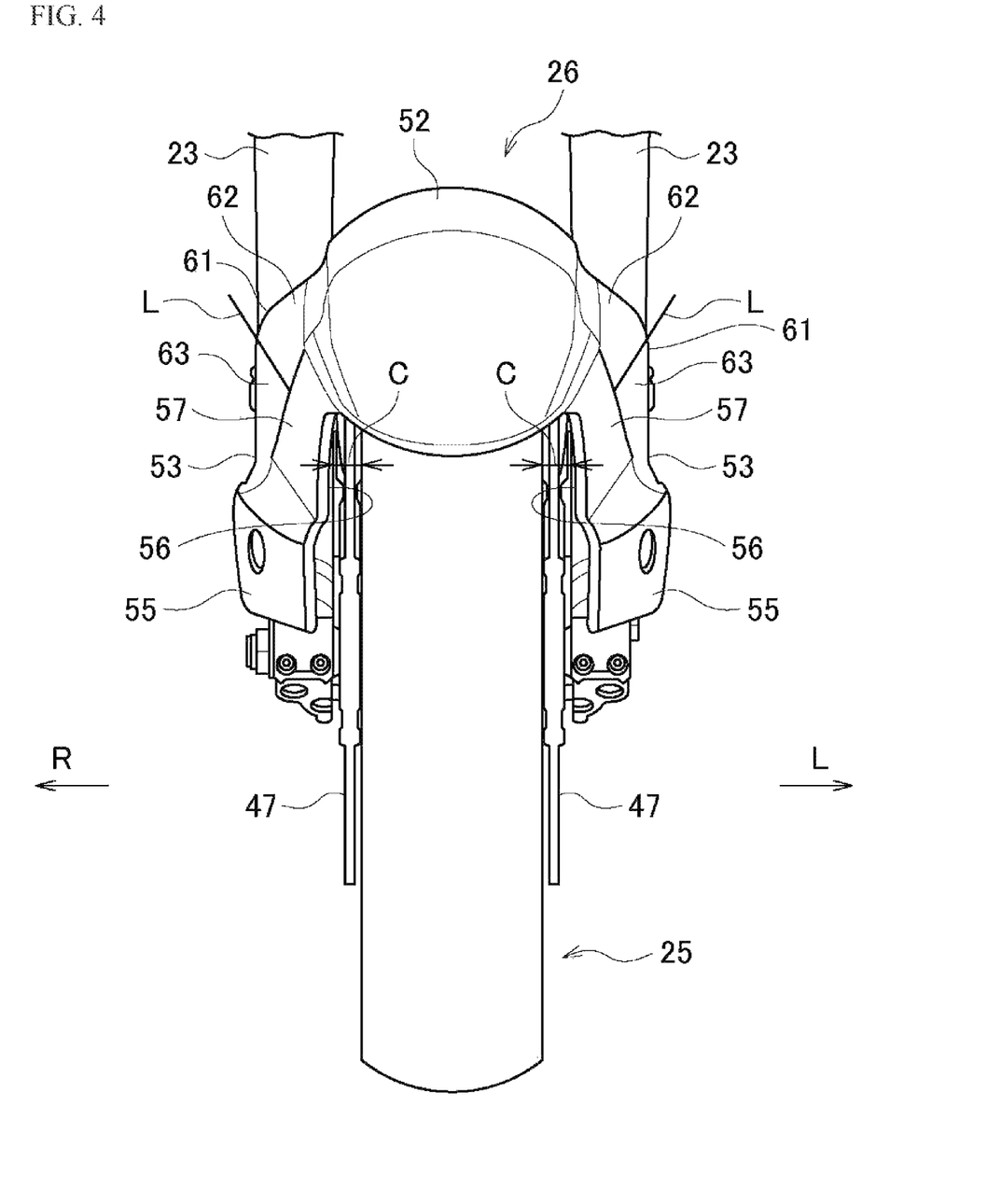
FIG. 4 is a front view showing the front wheel equipped with the front fender according to the present embodiment.
Figure 5:
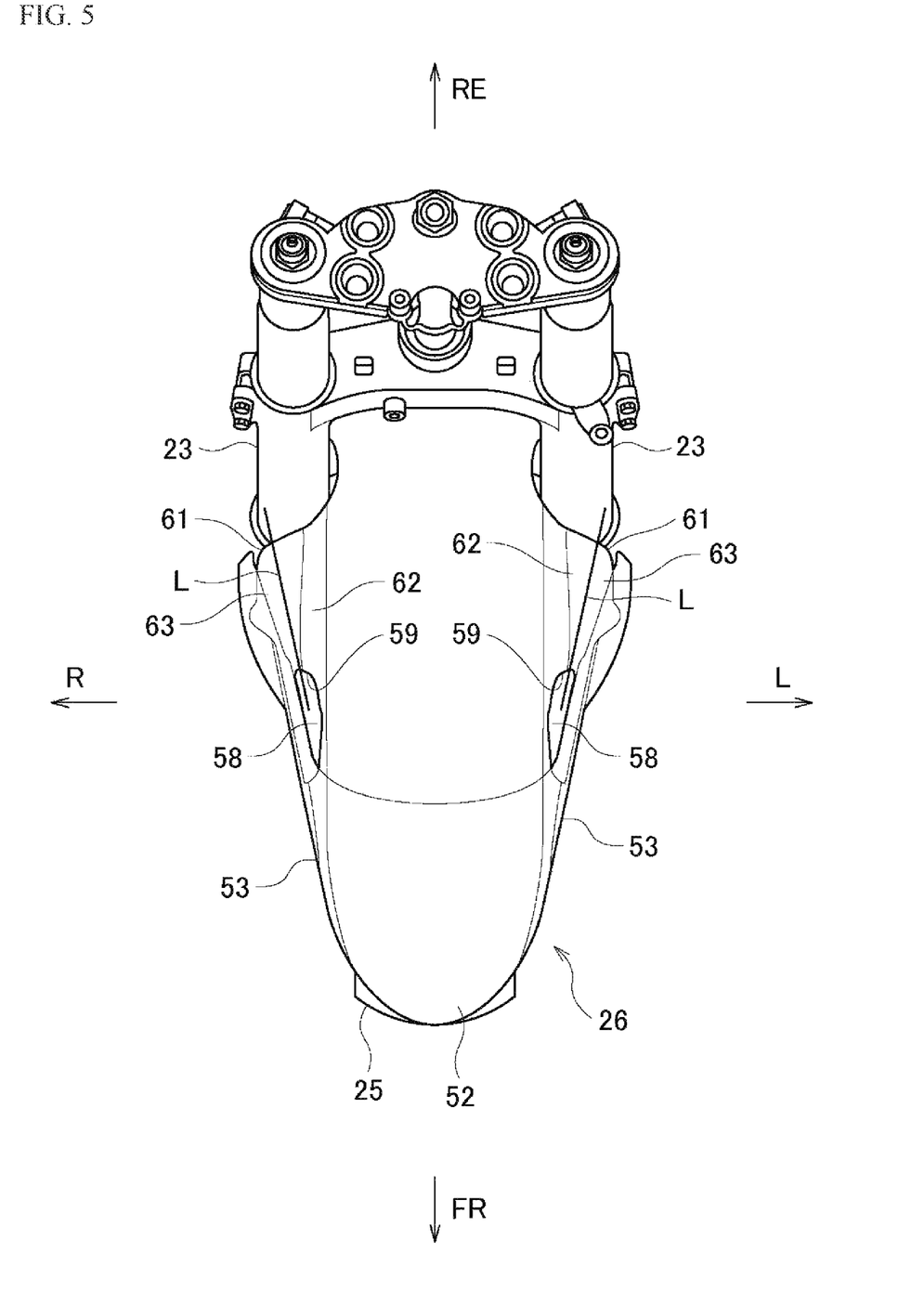
FIG. 5 is a top view showing the front wheel equipped with the front fender according to the present embodiment.

Hereinafter, a detailed configuration of the front fender will be described with reference to FIGS. 2 to 5. FIG. 2 is a perspective view showing a front wheel equipped with a front fender according to the present embodiment. FIG. 3 is a side view showing the front wheel equipped with the front fender according to the present embodiment. FIG. 4 is a front view showing the front wheel equipped with the front fender according to the present embodiment. FIG. 5 is a top view showing the front wheel equipped with the front fender according to the present embodiment.

As shown in FIG. 2, the front wheel 25 is rotatably supported by lower end portions of the pair of front forks 23 via an axle shaft 41. A wheel 42 of the front wheel 25 includes a hub 43 into which the axle shaft 41 is inserted, an annular rim 44 on which a tire 50 is mounted, and a plurality of spokes 45 that couple the hub 43 and the rim 44. A pair of left and right brake discs 47 having a ring plate shape are fixed to two side portions of the hub 43 of the wheel 42 via a pair of left and right brackets 46. Each brake disc 47 is positioned between the wheel 42 and a side face of the front fender 26. As described above, the pair of brake discs 47 are fixed to the front wheel 25 in a manner in which the pair of brake discs 47 can be rotated together with the front wheel 25.

The brake caliper 49 is fixed to a fixing portion 48 at a rear side of a lower portion of each front fork 23. The brake caliper 49 presses a brake pad (not shown) against the brake disc 47 to generate a braking force on the front wheel 25. A front brake includes the brake calipers 49 fixed to the front forks 23, and the brake discs 47 that are rotated together with the front wheel 25. The front fender 26 is fixed to a lower portion of each front fork 23 via a plurality of stays 51 (only one stay 51 is shown in the present embodiment, see FIG. 3). The front fender 26 serves as a mudguard and also forms a flow path for guiding traveling wind to the brake discs 47.

As shown in FIGS. 2 to 4, the front fender 26 includes a fender upper portion 52 that covers, from above, the front wheel 25 provided with the brake disc 47, and a fender side portion 53 that covers an upper portion of the brake disc 47 from a side. The fender upper portion 52 is formed into an arch shape in a side view following an outer surface shape of an upper portion of the tire 50, and the fender side portion 53 spreads in a fan shape in a side view from the vicinity of the center of the front wheel 25 toward the fender upper portion 52. A rear side of the fender side portion 53 is opened so as to avoid the front fork 23, and an elongated opening 54 prevents the fender side portion 53 and the front fork 23 from interfering with each other.

A lower portion of the fender side portion 53 overlaps with the front fork 23 in a front view (see FIG. 4 in particular), and functions as a mudguard portion 55 for the lower portion of the front fork 23. A gap C is formed between the fender side portion 53 and the front wheel 25. Traveling wind enters the front fender 26 from the gap C and cools the brake disc 47. The fender side portion 53 is formed with a bulging portion 57 that bulges outward in a vehicle width direction from a front edge 56 of the fender side portion 53 toward a rear side. The air discharge port 58 is formed at a rear face side of the bulging portion 57. The air discharge port 58 discharges traveling wind flowing into the bulging portion 57 from the front edge 56 of the front fender 26 to a rear side.

More specifically, the bulging portion 57 extends obliquely upward and rearward from the front edge 56 of the fender side portion 53. In this case, the gap C between the bulging portion 57 and the front wheel 25 increases from an obliquely upper front position toward an obliquely lower rear position. That is, the bulge of the bulging portion 57 is the largest at an obliquely lower rear position. The air discharge port 58 is opened to face obliquely upward and rearward at a rear face side of the bulging portion 57, and the air discharge port 58 extends obliquely downward and rearward along a rear edge of the bulging portion 57. Therefore, widths of an upper edge and a lower edge of the air discharge port 58 increase toward a rear side following the bulge of the bulging portion 57, and traveling wind inside the bulging portion 57 is likely to be discharged smoothly from the air discharge port 58.

The air discharge port 58 is positioned above the brake disc 47 in a side view, and hot air in the vicinity of the brake disc 47 is easily discharged from the air discharge port 58. In a side view, the air discharge port 58 is positioned rearward of a front end of the brake disc 47 and is positioned forward of the front fork 23, and the air discharge port 58 is directed in a direction D1 along an extending direction of the front fork 23. Accordingly, traveling wind discharged from the air discharge port 58 is less likely to hit the front fork 23, turbulence of the traveling wind is suppressed and the traveling wind is smoothly discharged from the air discharge port 58. Therefore, a cooling effect of the brake disc 47 is improved. The direction D1 indicates a direction when a straight line orthogonal to an opening surface of the air discharge port 58 is viewed from a side.

In a side view, the air discharge port 58 is positioned forward of the axle shaft 41, and the front fork 23 extends obliquely upward and rearward from the axle shaft 41. The air discharge port 58 is away from the front fork 23 toward an upper portion, the traveling wind discharged from the air discharge port 58 is less likely to hit the front fork 23 and the traveling wind is smoothly discharged from the air discharge port 58. A tip end of the front fender 26 (fender upper portion 52) is positioned below the air discharge port 58. Accordingly, a flow path passing through the air discharge port 58 is formed from a tip end side of the front fender 26 toward the air discharge port 58 in an obliquely upward and rearward direction.

As shown in FIGS. 3 to 5, a guide portion 61 is formed at the fender side portion 53 so as to cover a front side of the front fork 23 at a rear side of the air discharge port 58. The guide portion 61 bulges upward of the air discharge port 58 and outward in a vehicle width direction at a front side of the front fork 23, and the guide portion 61 guides the traveling wind discharged from the air discharge port 58 to a rear side. The guide portion 61 is divided into a front face portion 62 at an inner side in the vehicle width direction and a side face portion 63 at an outer side in the vehicle width direction. The front face portion 62 and the side face portion 63 sandwich a straight line L extending from a rear edge 59 of the air discharge port 58 toward an outer side surface of the front fork 23 (see FIG. 5 in particular). The front face portion 62 and the side face portion 63 of the guide portion 61 are continuous so as to form a smooth curved surface.

The front face portion 62 of the guide portion 61 bulges upward from the rear edge 59 of the air discharge port 58 to a rear side so as to guide the traveling wind upward at a front side of the front fork 23 from the air discharge port 58. The side face portion 63 of the guide portion 61 bulges rearward in the vehicle width direction from the rear edge 59 of the air discharge port 58 so as to guide the traveling wind to an outer side of the front fork 23 in the vehicle width direction from the air discharge port 58. The traveling wind discharged from the air discharge port 58 flows upward and outward in the vehicle width direction along the bulges of the front face portion 62 and the side face portion 63. Since the traveling wind flows to a rear side while avoiding the front fork 23, the cooling effect on the brake disc 47 is further improved.

As described above, the front fender 26 is formed with the air discharge port 58 through which the traveling wind smoothly flows from an inner side to an outer side of the fender side portion 53, and the brake disc 47 is actively cooled using the traveling wind. Although the front fork 23 is positioned rearward of the air discharge port 58, since the front fork 23 is covered by the substantially streamlined guide portion 61, the front fork 23 does not hinder a flow of the traveling wind. The air resistance to the front fender 26 due to the traveling wind is reduced, and the traveling wind is smoothly guided toward the brake disc 47 at an inner side of the front fender 26.

As shown in FIG. 4, in a front view, the bulging portion 57 bulges outward in the vehicle width direction, and the air discharge port 58 (see FIG. 2) is positioned at a rear face side of the bulging portion 57, which is a blind spot. Since the air discharge port 58 is formed at a blind spot formed in the bulging portion 57, the air discharge port 58 is less likely to be noticeable, and an appearance of the vehicle is suppressed from being deteriorated. The bulging portion 57 is located inward of the guide portion 61 in the vehicle width direction. The bulging portion 57 is formed to be smaller than the guide portion 61 in a front view, and the bulging portion 57 overlaps with the guide portion 61 that hides the front fork 23, so that the bulging portion 57 is less likely to be noticeable. The bulge of the bulging portion 57 is reduced and a size of the front fender 26 is reduced.

Figure 6A:
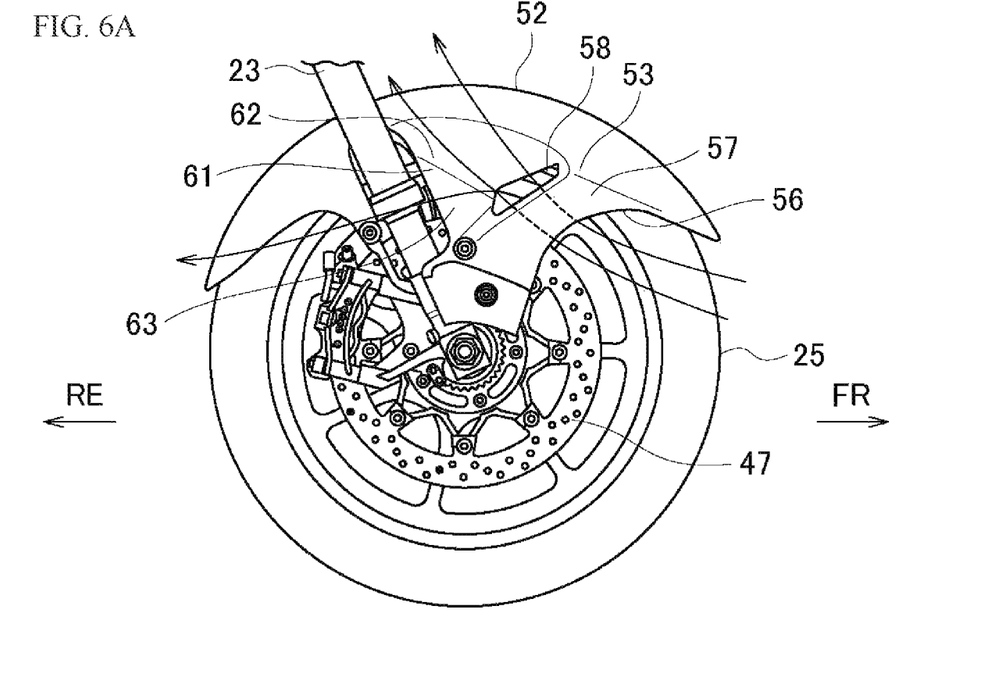
FIGS. 6A and 6B are views showing a flow of traveling wind passing through the front fender according to the present embodiment.
Figure 6B:
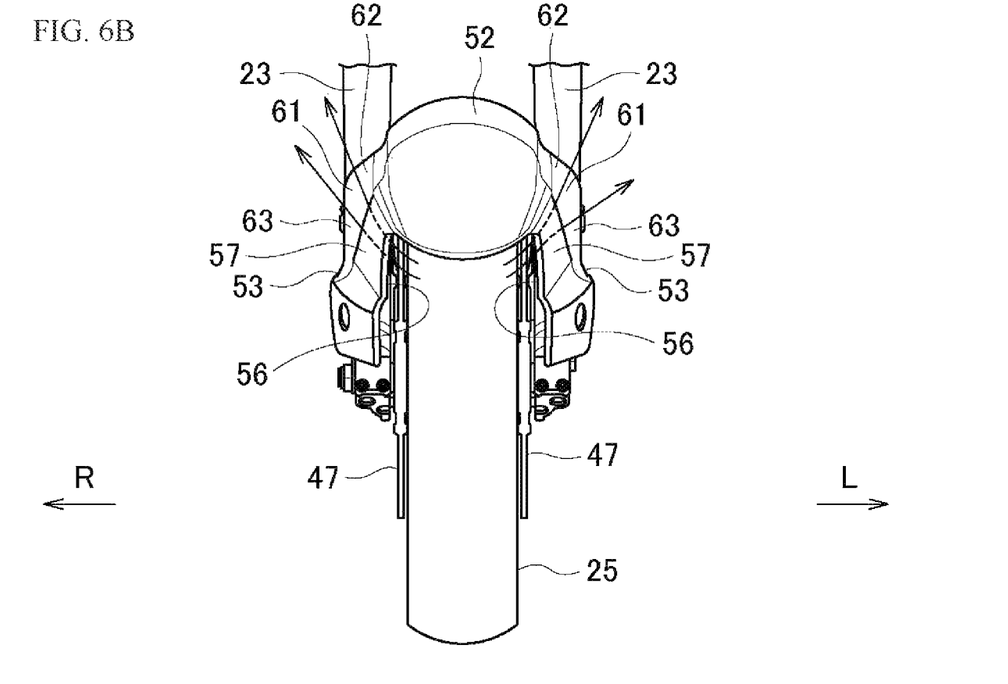

A flow of traveling wind passing through the front fender will be described with reference to FIGS. 6A and 6B. FIGS. 6A and 6B are views showing a flow of traveling wind passing through the front fender according to the present embodiment. FIG. 6A shows the flow of the traveling wind when viewed from a side, and FIG. 6B shows the flow of the traveling wind when viewed from a front side.

As shown in FIGS. 6A and 6B, when the straddle-type vehicle 1 travels, traveling wind enters an inner side of the bulging portion 57 from the front edge 56 of the fender side portion 53. The traveling wind flows along an inner surface of the bulging portion 57, and the traveling wind is discharged from the air discharge port 58 at a rear face side of the bulging portion 57. Since a tip end of the fender upper portion 52 is located at a position lower than the air discharge port 58, the traveling wind flows obliquely upward and rearward through an inner side of the bulging portion 57 from the front edge 56 of the fender side portion 53 toward the air discharge port 58. The traveling wind is blown to the brake disc 47, hot air in the periphery of the brake disc 47 is taken away by the traveling wind, and the traveling wind containing the hot air is discharged from the air discharge port 58.

Since the air discharge port 58 is formed to follow the bulge of the bulging portion 57, the traveling wind is smoothly discharged from the air discharge port 58. Although the front fork 23 is located rearward of the air discharge port 58, most of the traveling wind does not flow toward the front fork 23 since the air discharge port 58 is directed obliquely upward and rearward in the same direction as the extending direction of the front fork 23. Although a part of the traveling wind flows toward the front fork 23, and a front side of the front fork 23 is covered with the guide portion 61. Therefore, this part of the traveling wind is not blown against the front fork 23, and a flow of the traveling wind is not disturbed by the front fork 23.

The traveling wind flowing toward the front fork 23 flows along the front face portion 62 and the side face portion 63 of the guide portion 61 and is divided into two parts. One part of the traveling wind flows upward along the front face portion 62 in front of the front fork 23, and the other part of the traveling wind flows outward in the vehicle width direction along the side face portion 63 in front of the front fork 23. Since the front face portion 62 and the side face portion 63 are formed into substantially streamlined curved faces, the increase of the air resistance due to the guide portion 61 is suppressed to the minimum. In this manner, the traveling wind enters the bulging portion 57 from the front edge 56 of the fender side portion 53 and the traveling wind smoothly flows out from the air discharge port 58, so that the brake disc 47 at an inner side of the fender side portion 53 is effectively cooled by the traveling wind.

As described above, according to the present embodiment, the traveling wind flows into the bulging portion 57 from the front edge 56 of the fender side portion 53, and the traveling wind is discharged from the air discharge port 58 at a rear face side of the bulging portion 57. The traveling wind smoothly flows from the front edge 56 of the fender side portion 53 to the air discharge port 58, and the brake disc 47 at an inner side of the fender side portion 53 is effectively cooled by the traveling wind. Since the air discharge port 58 is formed at a blind spot formed in the bulging portion 57 in a front view, the air discharge port 58 is less likely to be noticeable and an appearance of the vehicle is not deteriorated. In addition, the size of the front fender 26 is not increased to an extent of affecting the appearance of the vehicle due to the formation of the air discharge port 58 in the front fender 26.

Although the bulging portion is formed to bulge in the vehicle width direction from the front edge of the fender side portion toward the rear side in the present embodiment, a shape of the bulging portion is not particularly limited. The bulging portion may be formed as long as the bulging portion bulges outward in the vehicle width direction at a front side of the fender side portion.

Although the air discharge port is formed to become wider toward the rear side in the present embodiment, a shape of the air discharge port is not particularly limited. The air discharge port may be formed into any shape as long as the air discharge port can discharge the traveling wind flowing into the bulging portion.

Although the air discharge port is positioned at a front side of the front fork in the present embodiment, the air discharge port may be positioned at a rear face side of the bulging portion which is a blind spot in a front view. Although the air discharge port is positioned above the brake disc, the air discharge port may be positioned at a side of the brake disc. Although the air discharge port is positioned above the tip end of the fender upper portion, the air discharge port may be positioned below the tip end of the fender upper portion.

Although the air discharge port is directed in the direction along the extending direction of the front fork in the present embodiment, an orientation of the air discharge port is not particularly limited. The air discharge port may be directed in a direction intersecting the extending direction of the front fork. The direction along the extending direction of the front fork is not limited to a direction parallel to the extending direction of the front fork, and may be a direction substantially parallel to the extending direction of the front fork.

Although the guide portion is formed to bulge upward of the air discharge port and outward in the vehicle width direction at a front side of the front fork in the present embodiment, a shape of the guide portion is not particularly limited. The guide portion may be formed to have an outer surface shape that guides the traveling wind discharged from the air discharge port in a manner of avoiding the front fork.

The front fender according to the present embodiment can be appropriately applied to other straddle-type vehicles such as a three-wheeled motor vehicle. Here, the straddle-type vehicle is not limited to general vehicles on which a rider drives the vehicle in a posture of straddling a seat, and also includes a scooter-type vehicle on which a rider drives the vehicle without straddling a seat.

As described above, the front fender (26) according to the present embodiment includes the fender upper portion (52) that covers, from above, the front wheel (25) provided with the brake disc (47), and the fender side portion (53) that covers an upper portion of the brake disc from a lateral side of the brake disc. The fender side portion is formed with the bulging portion (57) that bulges outward in the vehicle width direction at a front side of the fender side portion and the air discharge port (58) that is configured to discharge traveling wind flowing into the bulging portion. The air discharge port is positioned at a rear face side of the bulging portion which is a blind spot in a front view of the front fender. According to this configuration, the traveling wind flows into the bulging portion, and the traveling wind is discharged from the air discharge port at the rear face side of the bulging portion. The traveling wind inside the bulging portion smoothly flows to the air discharge port, and the brake disc inside the fender side portion is effectively cooled by the traveling wind. Since the air discharge port is formed at a blind spot formed in the bulging portion in a front view, the air discharge port is less likely to be noticeable and an appearance of the vehicle is not deteriorated. In addition, the size of the front fender is not increased to an extent of affecting the appearance of the vehicle due to the formation of the air discharge port in the front fender.

In the front fender according to the present embodiment, the air discharge port becomes wider toward a rear side of the air discharge port. According to this configuration, since the air discharge port becomes larger following the bulge of the bulging portion, the traveling wind can be more smoothly discharged from an inner side of the bulging portion.

In the front fender according to the present embodiment, the air discharge port is positioned at a front side of the front fork (23) that supports the front wheel, and the air discharge port is directed in a direction along the extending direction of the front fork. According to this configuration, the traveling wind is less likely to hit the front fork, turbulence of the traveling wind is suppressed, and the traveling wind can be smoothly discharged from the air discharge port.

In the front fender according to the present embodiment, the fender side portion is formed with the guide portion (61) that is configured to guide the traveling wind discharged from the air discharge port to a rear side of the fender side portion, and the guide portion bulges upward of the air discharge port and outward in the vehicle width direction at the front side of the front fork. According to this configuration, the traveling wind discharged from the air discharge port flows upward along the bulge of the guide portion and flows outward in the vehicle width direction, and the traveling wind is smoothly guided to a rear side of the vehicle in a manner of avoiding the front fork.

In the front fender according to the present embodiment, the guide portion is divided into the front face portion (62) at an inner side in the vehicle width direction and the side face portion (63) at an outer side in the vehicle width direction, the front face portion is configured to guide the traveling wind upward at a front side of the front fork from the air discharge port, and the side face portion is configured to guide the traveling wind outward of the front fork in the vehicle width direction from the air discharge port. According to this configuration, the front face portion and the side face portion of the guide portion smoothly guide the traveling wind to flow upward and outward in the vehicle width direction so as to avoid the front fork.

In the front fender according to the present embodiment, the bulging portion is located inward of the guide portion in the vehicle width direction in the front view of the front fender. According to this configuration, the bulging portion is formed to be smaller than the guide portion in a front view, and the bulging portion overlaps with the guide portion that hides the front fork, so that the bulging portion is less likely to be noticeable. The bulge of the bulging portion can be reduced and the size of the front fender can be reduced.

In the front fender according to the present embodiment, the air discharge port is located forward of the axle shaft (41) that supports the front wheel on the front fork. According to this configuration, the air discharge port is away from the front fork, the traveling wind is less likely to hit the front fork, and the traveling wind can be smoothly discharged from the air discharge port.

Although the present embodiment has been described, the above-described embodiment and modifications may be combined entirely or partially as other embodiment.

The technique of the present invention is not limited to the above-described embodiment, and various changes, substitutions, and modifications may be made without departing from the spirit of the technical concept of the present invention. The present invention may be implemented using other methods as long as the technical concept can be implemented by the methods through advance of the technology or other derivative technology. Therefore, the claims cover all embodiments that may be included within the scope of the technical concept.

What is claimed is:

1. A front fender comprising:
a fender upper portion that covers, from above, a front wheel provided with a brake disc; and
a fender side portion that covers an upper portion of the brake disc from a lateral side of the brake disc,
wherein the fender side portion is formed with a bulging portion that bulges outward in a vehicle width direction at a front side of the fender side portion and an air discharge port that is configured to discharge traveling wind flowing into the bulging portion from an inner side of the fender side portion to an outer side of the fender side portion, and
wherein the air discharge port is positioned at a rear face side of the bulging portion which is a blind spot in a front view of the front fender.

2. A front fender comprising:
a fender upper portion that covers, from above, a front wheel provided with a brake disc; and
a fender side portion that covers an upper portion of the brake disc from a lateral side of the brake disc,
wherein the fender side portion is formed with a bulging portion that bulges outward in a vehicle width direction at a front side of the fender side portion and an air discharge port that is configured to discharge traveling wind flowing into the bulging portion,
wherein the air discharge port is positioned at a rear face side of the bulging portion which is a blind spot in a front view of the front fender, and
wherein the air discharge port becomes wider toward a rear side of the air discharge port.

3. The front fender according to claim 1,
wherein the air discharge port is positioned at a front side of a front fork that supports the front wheel, and
wherein the air discharge port is directed in a direction along an extending direction of the front fork.

4. A front fender comprising:
a fender upper portion that covers, from above, a front wheel provided with a brake disc; and
a fender side portion that covers an upper portion of the brake disc from a lateral side of the brake disc,
wherein the fender side portion is formed with a bulging portion that bulges outward in a vehicle width direction at a front side of the fender side portion and an air discharge port that is configured to discharge traveling wind flowing into the bulging portion,
wherein the air discharge port is positioned at a rear face side of the bulging portion which is a blind spot in a front view of the front fender,
wherein the air discharge port is positioned at a front side of a front fork that supports the front wheel,
wherein the air discharge port is directed in a direction along an extending direction of the front fork,
wherein the fender side portion is formed with a guide portion that is configured to guide the traveling wind discharged from the air discharge port to a rear side of the fender side portion, and
wherein the guide portion bulges upward of the air discharge port and outward in the vehicle width direction at the front side of the front fork.

5. The front fender according to claim 4,
wherein the guide portion is divided into a front face portion at an inner side in the vehicle width direction and a side face portion at an outer side in the vehicle width direction,
wherein the front face portion is configured to guide the traveling wind upward at the front side of the front fork from the air discharge port, and
wherein the side face portion is configured to guide the traveling wind outward of the front fork in the vehicle width direction from the air discharge port.

6. The front fender according to claim 4,
wherein the bulging portion is located inward of the guide portion in the vehicle width direction in the front view of the front fender.

7. The front fender according to claim 4,
wherein the air discharge port is located forward of an axle shaft that supports the front wheel on the front fork.

* * * * *